Patented Dec. 16, 1930

1,785,417

UNITED STATES PATENT OFFICE

JOSEPH J. McEVOY AND CHARLES H. UPSON, OF WATERBURY, CONNECTICUT

PAINT AND VARNISH REMOVER

No Drawing. Application filed March 17, 1928. Serial No. 262,598.

This invention relates to improvements in viscous cleansing compositions which can be used for removing dirt, rust, grease, stains, paint, varnish, enamel, lacquer, etc. from metal or other surfaces.

One object of the invention is to provide a composition of the above nature which will not settle or lose its viscosity appreciably on long standing, and which will adhere to inclined or vertical surfaces without noticeable draining.

Various coal-tar solvents such as benzol, toluol and solvent naptha, petroleum distillates, acetone and other organic solvents have been employed as paint and varnish removers, but the handling of these solvent materials constitutes a fire hazard and the vapors given off are a distinct menace to the health of the workers.

Attempts have been made in the past to employ aqueous solutions of caustic alkali as ingredients of paint removers, but the compositions heretofore employed have been so thin that when applied to vertical or inclined surfaces, they would drain away very rapidly, and consequently would have very little cleaning effect.

By means of the present invention, the above and other disadvantages have been avoided and a cleansing and paint removing composition has been produced, having a colloidal nature, of high viscosity and which will maintain its non-soluble constituents in permanent suspension. It is also non-inflammable and non-injurious to the workers. In brief, the improved paint remover consists of a highly viscous fluid mixture of a "dissolving agent", an "abrasive agent", a "collecting agent", and a "thickening agent".

The "dissolving agent" which has been found preferable consists of an aqueous solution of a caustic alkali and a silicate of an alkali metal. It has been found that this solution acts to soften, disintegrate, dissolve, and saponify the film of material to be removed.

The preferred form of "collecting agent" consists of a water soluble iron salt which forms a stable flocculent precipitate in the presence of the "dissolving agent" above described. This flocculent precipitate imparts a collecting action to the cleansing fluid, whereby the film, softened, disintegrated, dissolved, or saponified by the "dissolving agent" is absorbed or embedded, and thereby removed from the surface to be cleaned.

The "abrasive agent" mentioned above is not an essential ingredient of the paint remover, but may be added if desirable when particularly resistant films are to be removed. One abrasive agent which has been found suitable consists of disintegrated mineral particles, such as silica, although pumice, rotten stone, or infusorial earth may be substituted therefor within the scope of the invention.

In order to hold the non-soluble constituents in suspension, i. e. the flocculent precipitate produced by the collecting agent, and the abrasive agent, if used, provision is made of a "thickening agent" which acts to impart a colloidal-like character to the final product. It increases the viscosity of the cleansing mass to the degree necessary to prevent drainage from the surfaces to be cleaned and thereby maintains a film of cleansing fluid in contact herewith for a period of time of sufficient duration to permit the cleansing and paint removal action to become effective.

Many materials which were tested for this purpose were found worthless owing to the fact that they were affected by the alkali present in such a way that their viscosity and suspending power were rapidly reduced. Among the materials, however, which were found suitable for this purpose, both from the standpoint of increasing the viscosity of the cleaning fluid and also resisting decomposition by the alkali present, are various kinds of flour, starch, agar agar, and gum tragacanth. Of the above-cited materials, wheat flour is preferred as the "thickening agent".

A specific example of the invention will now be described:

100 parts of flour are heated with 540 parts of water at 100 degrees C. until the flour is completely swelled up resulting in a thick paste, after which 90 parts of water glass (sodium silicate) solution (40–42 degrees Baumé) are added thereto and stirred. Seven parts of copperas, dissolved in 30 parts of water, are then added to the above mixture, after which is added a solution of 103 parts of caustic soda in 120 parts of water, and the entire mixture thoroughly stirred.

The above mixture, after allowing for a loss of 5 parts water by evaporation during the heating operation, will then have the following proportions: caustic soda 10.45%, water glass (40–42 degrees Baumé) 9.14%, copperas .71%, flour 10.15%, and water 69.55%.

As stated above, when operating on particularly resistant paint films, an "abrasive agent" may be added and 100 parts of finely disintegrated silica will be found sufficient in most cases.

It is to be understood that the order of adding the various ingredients as well as the proportions of the latter can be varied over wide limits without departing from the scope and spirit of this invention. Furthermore, the ingredients of the fluid cleaner may also be varied as, for example, caustic potash may be substituted for caustic soda, and in place of copperas other soluble iron salts may be used, and in general, the ordinary chemical equivalents of the various ingredients of the composition may be used.

While the invention is especially adapted for cleaning metal surfaces, it is to be understood that it is not to be limited to such use but may be also employed to clean surfaces of wood, stone, brick, tile, and other materials.

While there has been disclosed in this specification one example of how the invention may be practised, it will be understood that the invention is not to be limited to this example, but may be modified and embodied in various other ways without departing from its spirit. In short, the invention includes all the modifications and embodiments coming within the scope of the following claims.

Having thus fully described the invention, what is claimed as new, and for which it is desired to secure Letters Patent, is:

1. A composition of matter for the cleansing of surfaces comprising a pasty viscous mixture of a caustic alkali, an alkaline silicate, water, copperas and a thickening agent.

2. A composition of matter for the cleansing of surfaces comprising a pasty viscous mixture of a caustic alkali, an alkaline silicate, water, copperas, a thickening agent, and an abrasive agent.

3. A pasty composition of matter for the removal of paint, varnish, and lacquer resulting from the mixing together in a colloidal suspension of a caustic alkali, an alkaline silicate, water, a water soluble iron salt, and a thickening agent.

4. A composition of matter for the removal of paint resulting from the mixing together of caustic soda, water glass, water, copperas and flour.

5. A composition of matter for the removal of paint, resulting from the mixing together of about 10.45% caustic soda, 9.14% water glass (40–42 degrees Baumé), 69.55% water, .71% copperas, and 10.15% flour.

In testimony whereof, we have affixed our signatures to this specification.

JOSEPH J. McEVOY.
CHARLES H. UPSON.